(12) United States Patent
Morita

(10) Patent No.: US 8,379,157 B2
(45) Date of Patent: Feb. 19, 2013

(54) FLAT PANEL DISPLAY DEVICE

(75) Inventor: Shinji Morita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 504 days.

(21) Appl. No.: 12/758,913

(22) Filed: Apr. 13, 2010

(65) Prior Publication Data

US 2010/0265640 A1  Oct. 21, 2010

(30) Foreign Application Priority Data

Apr. 20, 2009  (JP) ................................. 2009-101714

(51) Int. Cl.
  *H04N 5/64*  (2006.01)
  *G02F 1/13*  (2006.01)
  *H05K 5/00*  (2006.01)
(52) U.S. Cl. ........................... 348/836; 349/58; 361/752
(58) Field of Classification Search .................. 348/836; 349/58
  See application file for complete search history.

(56) References Cited

U.S. PATENT DOCUMENTS

| 3,928,743 | A | 12/1975 | Ohashi | |
|---|---|---|---|---|
| 8,228,446 | B2* | 7/2012 | Fujikawa | ..................... 348/836 |
| 2005/0206801 | A1* | 9/2005 | Miura | ............................. 349/58 |
| 2008/0116045 | A1 | 5/2008 | Matsutani | |

FOREIGN PATENT DOCUMENTS

JP  09-326573 A  12/1997

OTHER PUBLICATIONS

Extended European Search Report of corresponding EP Application No. 10 16 0266.2 dated Jul. 19, 2010.

* cited by examiner

*Primary Examiner* — David Czekaj
*Assistant Examiner* — Tsion Owens
(74) *Attorney, Agent, or Firm* — Global IP Counselors

(57) ABSTRACT

A flat panel display device includes a cabinet, a flat panel display component, a control board, a switch unit, a switch unit holder, and a pair of screws. The switch unit has a support board and an AC switch. The switch unit holder has a holder main body with a pair of side plates that defines inside of the holder main body therebetween with the holder main body holding the support board of the switch unit inside of the holder main body, and a pair of screw mount portions that is integrally formed with the holder main body with the screw mount portions extending outside of the holder main body from the side plates of the holder main body, respectively. The screws are disposed through screw insertion holes of the screw mount portions and threaded into screw holes of the chassis of the flat panel display component.

3 Claims, 5 Drawing Sheets

FLAT PANEL DISPLAY DEVICE

CROSS-REFERENCE TO RELATED APPLICATIONS

This application claims priority to Japanese Patent Application No. 2009-101714 filed on Apr. 20, 2009. The entire disclosure of Japanese Patent Application No. 2009-101714 is hereby incorporated herein by reference.

BACKGROUND

1. Field of the Invention

The present invention generally relates to a flat panel display device. More specifically, the present invention relates to a flat panel display device having an AC switch.

2. Background Information

A conventional flat panel display device has a liquid crystal television set. The flat panel display device has a cabinet, a stand, a liquid crystal module, a control board, a power cord, a support board, and an AC switch. The control board includes a printed wiring board. The control board is fixed to a chassis of the liquid crystal module. The liquid crystal module is disposed inside the cabinet. The cabinet has a front cabinet and a rear cabinet. The support board has a printed wiring board. The AC switch is connected to the support board. The support board and the AC switch are interposed at some point along the power cord. The power cord is connected to the control board. The support board is fixed via an insulating material to a rear face of the chassis by four screws that are disposed through inside corners of the support board. The AC switch is exposed to the outside from an opening formed in the rear cabinet. The AC switch is operated to turn the power on and off. A conventional attachment structure for a circuit board is also well known (see Japanese Laid-Open Patent Application Publication No. H9-326573, for example).

With the conventional flat panel display device, the support board with the AC switch is fixed to the chassis with the four screws. Since the four screws are used, more parts are required, which increases the cost and also entails more work and time for fixing the support board. Thus, work efficiency is low.

Also, there needs to be enough insulating distance (creepage distance) between the AC switch and the screws so that no short circuiting will occur between the AC switch and the screws, which makes the support board larger and drives up the cost.

SUMMARY

The present invention was conceived in light of the above-mentioned problems. One object of the present invention is to provide a flat panel display device with which an AC switch can be attached quickly and easily with an inexpensive structure.

In accordance with one aspect of the present invention, a flat panel display device includes a cabinet, a flat panel display component, a control board, a switch unit, a switch unit holder, and a pair of screws. The flat panel display component is disposed within the cabinet. The flat panel display component has a chassis with a pair of screw holes. The control board is fixedly coupled to the chassis of the flat panel display component. The switch unit is configured to switch power supply to the control board. The switch unit has a support board that is electrically connected to the control board and an AC switch that is disposed on the support board and is electrically connected to the support board. The switch unit holder is made of an insulating material and fixedly coupled to the chassis of the flat panel display component. The switch unit holder has a holder main body with a pair of side plates that defines inside of the holder main body therebetween with the holder main body holding the support board of the switch unit inside of the holder main body, and a pair of screw mount portions that is integrally formed with the holder main body with the screw mount portions extending outside of the holder main body from the side plates of the holder main body, respectively. Each of the screw mount portions has a screw insertion hole. The screws are disposed through the screw insertion holes of the screw mount portions of the switch unit holder and threaded into the screw holes of the chassis of the flat panel display component such that the switch unit holder is fixedly coupled to the chassis of the flat panel display component with the screws.

With this flat panel display device, it is possible to provide a flat panel display device with which an AC switch can be attached quickly and easily with an inexpensive structure.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 1:
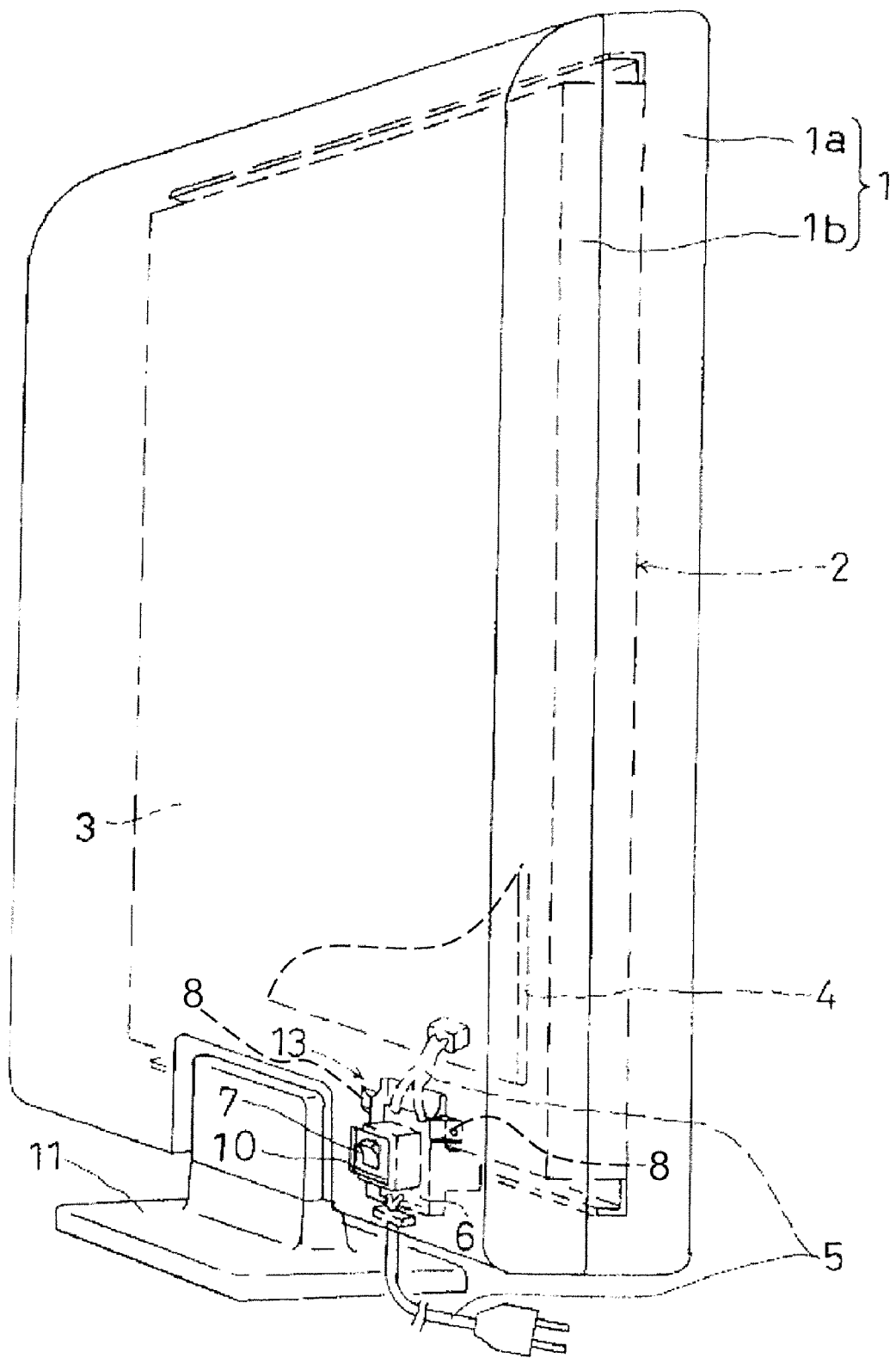
FIG. 1 is a perspective view of a flat panel display device in accordance with one embodiment.

As shown in FIG. 1, a flat panel display device includes a liquid crystal television set. The flat panel display device has a cabinet 1, a liquid crystal module (e.g., flat panel display component) 2 with a chassis 3, a control board 4, a power cord 5, a support board 6, an AC switch 7, a pair of screws 8, a stand 11 and a holder (e.g., switch unit holder) 13. The cabinet 1 has a front cabinet 1a and a rear cabinet 41b. The liquid crystal module 2 is disposed inside the cabinet 1. The liquid crystal module 2 also has a liquid crystal cell to display image. The chassis 3 has a rear face 3a with a pair of screw holes 3c. The control board 4 is fixed to the chassis 3 of the liquid crystal module 2. The control board 4 has a printed wiring board. The control board 4 is electrically connected to the liquid crystal module 2 and the support board 6. The power cord 5 is electrically connected to the control board 4. The support board 6 has a printed wiring board. The AC switch 7 is disposed on the support board 6 and is electrically connected to the support board 6. The support board 6 and the AC switch 7 are interposed at some point along the power cord 5. The support board 6 and the AC switch 7 forms a switch unit that switches power supply from the power cord 5 to the control board 4 and the liquid crystal module 2. The support board 6 and the AC switch 7 are fixedly coupled to the rear face 3a of the chassis 3 via the holder 13. The AC switch 7 is exposed to the outside from an opening 10 formed in the rear cabinet 1b. The AC switch 7 is operated to turn the power on and off. The stand 11 is fixedly coupled to the cabinet 1.

The holder 13 is made of an insulating material, such as a synthetic resin. The holder 13 is fixedly coupled to the rear face 3a of the chassis 3 with the screws 8 that are fastened to the screw holes 3c. The holder 13 is used to fix the support board 6, which is connected to the AC switch 7, to the chassis 3. The chassis 3, the support board 6, the AC switch 7, and the holder 13 correspond to a switch attachment structure of the flat panel display device.

As shown in FIGS. 2 to 6, the holder 13 mainly includes a rectangular box-shaped holder main body 13A and a leg component 13B. The holder main body 13A is disposed on the rear face 3a of the chassis 3. The leg component 13B is integrally provided protruding from a bottom face of the holder main body 13A, and extends along a side face 3b (e.g., bottom side face) of the chassis 3. The holder 13 is integrally formed as a one-piece, unitary member.

As shown in FIGS. 2 to 6, the holder main body 13A has a bottom plate 13a, a pair of side plates (e.g., left and right side plates) 13b, a pair of screw mounts (e.g., screw mount portions or left and right screw mounts) 13c, a rear plate 13d, a pair of lateral plates (e.g., first and second lateral plates) 13e and 13f, a pair of engagement prongs 13g, a pair of elastic plates (e.g., left and right elastic plates) 13h, a pair of hooks (e.g., left and right hooks) 13i, a pair of longitudinal plates 13j, a U-shaped frame body 13k, and a plurality of reinforcing plates 13m. The bottom plate 13a is larger than the support board 6 when viewed from the normal direction of the bottom plate 13a so that support board 6 is disposed within an inside space (e.g., inside) of the holder main body 13A of the holder 13. More specifically, the side plates 13b of the holder main body 13A defines the inside space therebetween. The holder main body 13A holds the support board 6 within the inside space of the holder main body 13A. The side plates 13b are parallel to each other and are bent at a right angle from both side edges (e.g., opposite side edges) of the bottom plate 13a. The screw mounts 13c are integrally provided protruding from near front end portions of outer peripheral faces of the side plates 13b, respectively. In particular, the screw mounts 13c extend outside of the holder main body 13A from the side plates 13b, respectively. The rear plate 13d is formed integrally with the side plates 13b and is bent at a right angle from a rear end edge of the bottom plate 13a. An opening 14 is formed in forward and backward directions a and b, from a front end face of the holder main body 13A, through the side plates 13b, and up to the rear plate 13d. The opening 14 corresponds to the inside space of the holder 13.

As shown in FIGS. 2 to 6, the lateral plates 13e and 13f are integrally provided protruding at a specific spacing in the forward and backward directions a and b on the bottom plate 13a of the holder main body 13A. The lateral plates 13e and 13f extend perpendicular to the forward and backward directions a and b. Both end portions of the lateral plates 13e and 13f extend to the side plates 13b, respectively, and are formed integrally with the side plates 13b. Recesses 15 for fitting and receiving the support board 6 are formed in upper faces of the lateral plates 13e and 13f, respectively. The engagement prongs 13g stick out in the forward direction a and parallel to the bottom plate 13a. The engagement prongs 13g are integrally provided to both lateral ends (e.g., both end portions) of the lateral plate 13e protruding from corners formed between the side plates 13b and the lateral plate 13e on the front end side of the holder 13.

Figure 5:
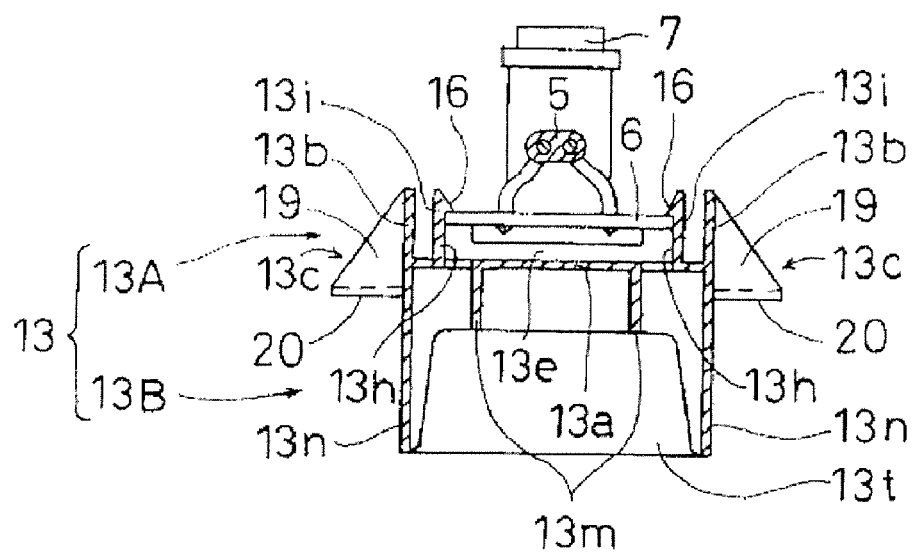
FIG. 5 is a cross sectional view of the switch attachment structure taken along V-V line in FIG. 4.
Figure 6:
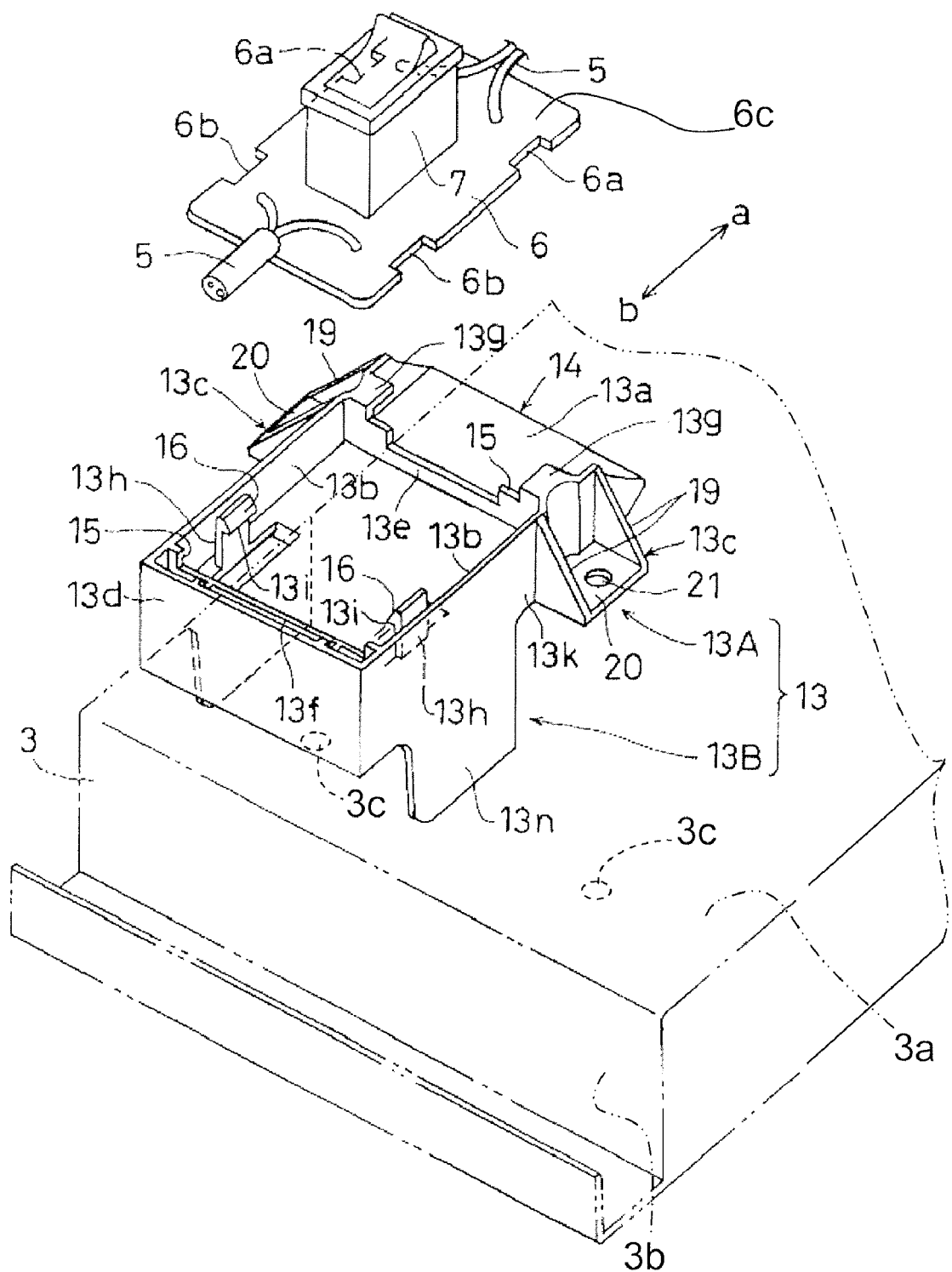
FIG. 6 is an exploded perspective view of the switch attachment structure.

As shown in FIGS. 5 and 6, the elastic plates 13h are capable of elastic displacement. The elastic plates 13h are integrally provided protruding at a specific spacing in left and right directions perpendicular to the forward and backward directions a and b between the lateral plates 13e and 13f on the bottom plate 13a. The hooks 13i are integrally formed at the distal ends of the elastic plates 13h, respectively. The elastic plates 13h and the hooks 13i correspond to hook portions. The hooks 13i stick out from the distance ends of the elastic plates 13h toward a center portion of the holder main body 13A inside the holder main body 13A. Distal end faces of the hooks 13i includes inclination guide faces 16 that incline downward toward the center portion of the holder main body 13A.

Figure 2:
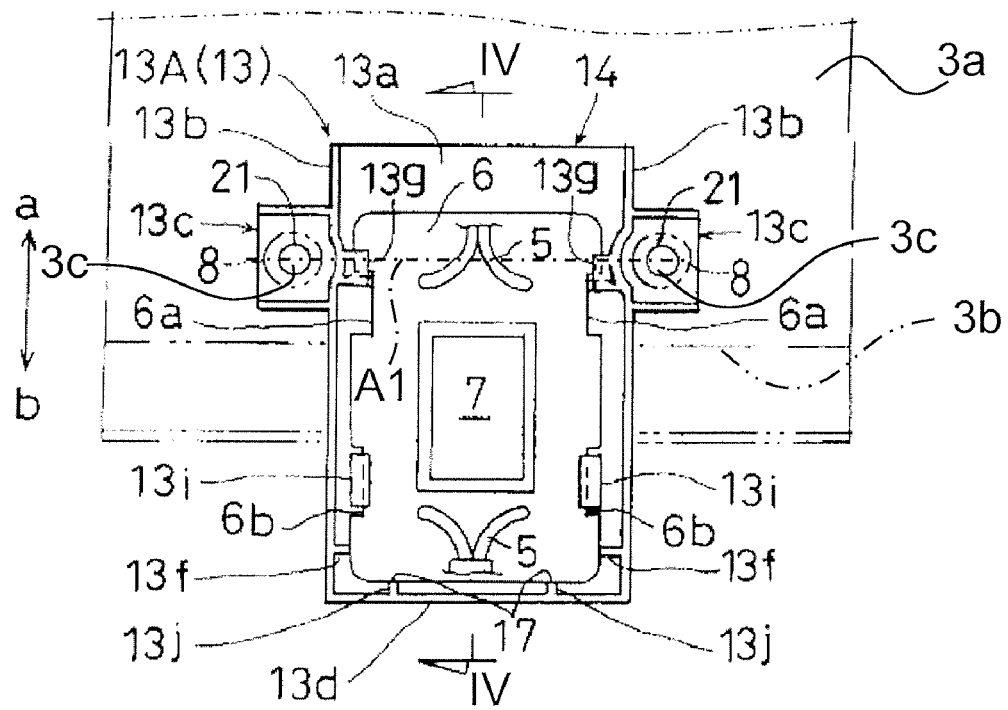
FIG. 2 is an elevational view of a switch attachment structure of the flat panel display device illustrated in FIG. 1.
Figure 4:
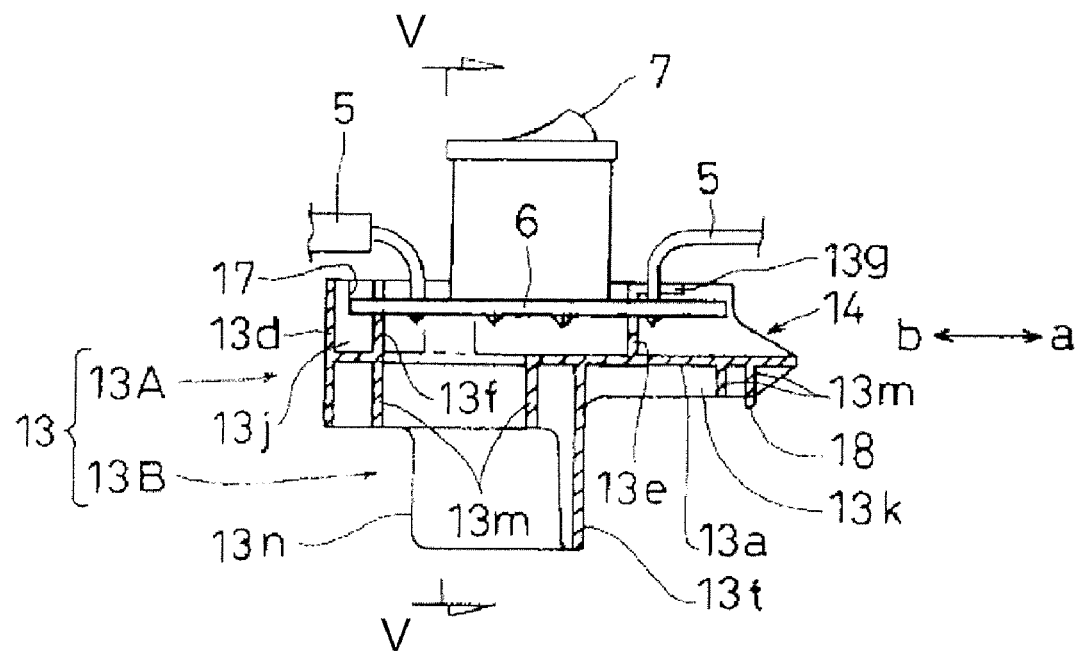
FIG. 4 is a cross sectional view of the switch attachment structure taken along IV-IV line in FIG. 2.

As shown in FIGS. 2 and 4, the longitudinal plates 13j are integrally formed at a specific spacing in the left and right directions perpendicular to the forward and backward directions a and b, between the rear plate 13d and the lateral plate 13f on the rear end side of the holder 13. Recessed steps 17 for fitting the support board 6 are formed on upper faces of the longitudinal plates 13j, respectively.

As shown in FIGS. 4 and 5, the reinforcing plates 13m intersect crossways. In particular, the reinforcing plates 13m includes a pair of first plates that extends in the forward and backward directions a and b, and four second plates that extend in the left and right directions and intersects the first plates. The reinforcing plates 13m are integrally formed inside the U-shaped frame body 13k that extends below the bottom plate 13a and is formed integrally with the side plates 13b and the rear plate 13d. A pair of left and right hemispherical positioning protrusions 18 is integrally provided protruding from a lower face of one of the reinforcing plates (e.g., one of the second plates) 13m formed on the front edge side of the holder 13.

As shown in FIGS. 5 and 6, each of the screw mounts 13c has a pair of front and rear support plates 19, and a screw contact plate 20. The support plates 19 are integrally provided protruding from the side plates 13b all the way to the frame body 13k. The screw contact plates 20 are integrally formed between the front and rear support plates 19, respectively. Screw insertion holes 21 are made in the screw contact plates 20, respectively. Lower faces of the screw contact plates 20 are formed so as to be in plane with a lower face of the U-shaped frame body 13k.

Figure 3:
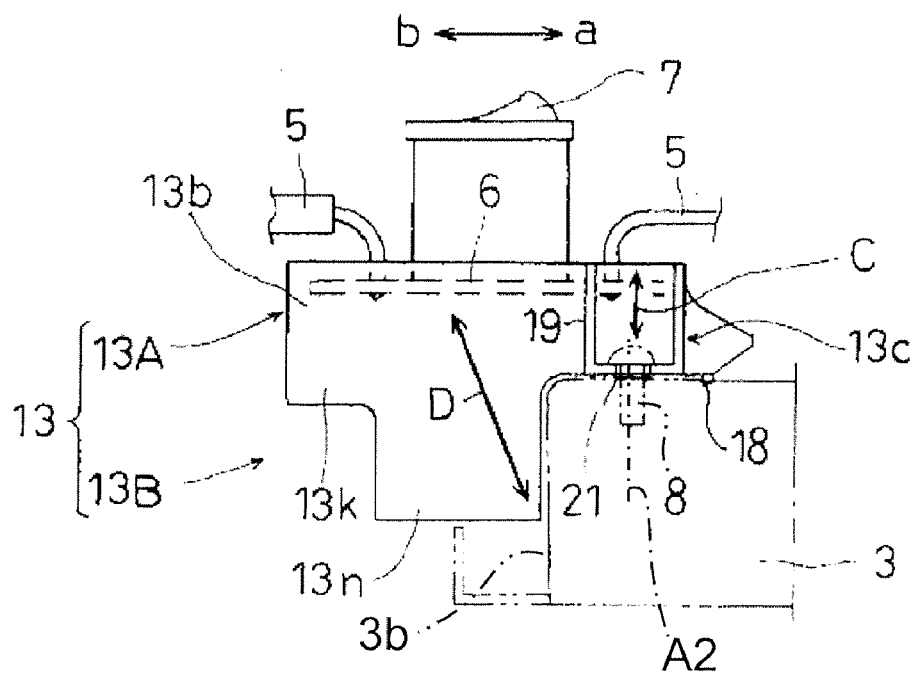
FIG. 3 is a side elevational view of the switch attachment structure.

As shown in FIGS. 4 and 5, the leg component 13B includes a pair of longitudinal leg plates 13n and a lateral leg plate 13t. The longitudinal leg plates 13n extend downward from the both side parts of the U-shaped frame body 13k. The lateral leg plate 13t is integrally formed between front end portions of the longitudinal leg plates 13n. The lateral leg plate 13t of the leg component 13B extends from the holder main body 13A along the side face 3b of the chassis. As shown in FIGS. 2 and 3, the AC switch 7 and the leg component 13B are located on a same side of the flat panel display device relative to an axis A1 that extends through centers of the screw insertion holes 21 of the screw mounts 13c when viewed from a direction parallel to central axes A2 of the screw insertion holes 21.

As shown in FIG. 6, the support board 6 includes a total of four recesses (e.g., a pair of first recesses and a pair of second recesses) 6a and 6b at locations corresponding to the engagement prongs 13g and the hooks 13i. In particular, the support board 6 includes two front recesses 6a and two rear recesses 6b on two side edges of the support board 6, opposite the engagement prongs 13g and the hooks 13i. The front recesses 6a are formed at front end portions (e.g., one end portions) of the side edges of the support board 6 that correspond to the engagement prongs 13g. The rear recesses 6b are formed at rear end portions (e.g., the other end portions) of the side edges of the support board 6 that correspond to the elastic plates 13h and the hooks 13i.

The procedure for attaching the support board 6 with the AC switch 7 to the holder 13 will now be described. As shown in FIG. 3, the positioning protrusions 18 of the holder 13 are fitted into positioning holes (not shown) in the chassis 3 to position the holder 13. Then, the screws 8 are inserted through the screw insertion holes 21 of the screw mounts 13c, respectively. Furthermore, the screws 8 are threaded into the screw holes 3c of the rear face 3a of the chassis 3, respectively. As a result, the screw mounts 13c are screwed down to the rear face 3a of the chassis 3, and the holder 13 is fixed to the chassis 3.

Figure 7A:
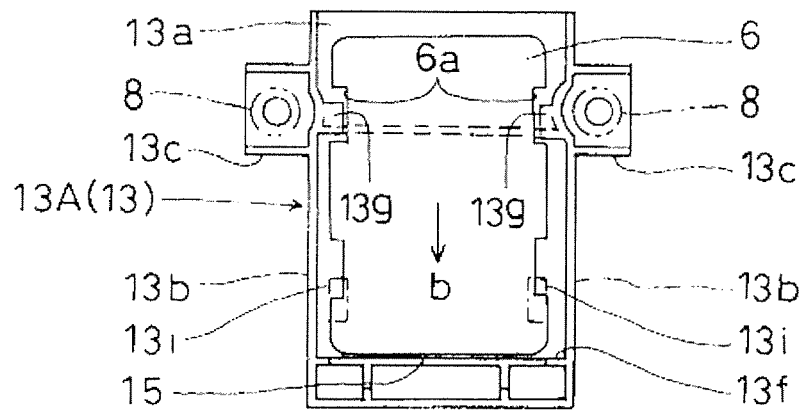
FIG. 7A is a diagram illustrating a procedure for assembling the switch attachment structure.
Figure 7B:
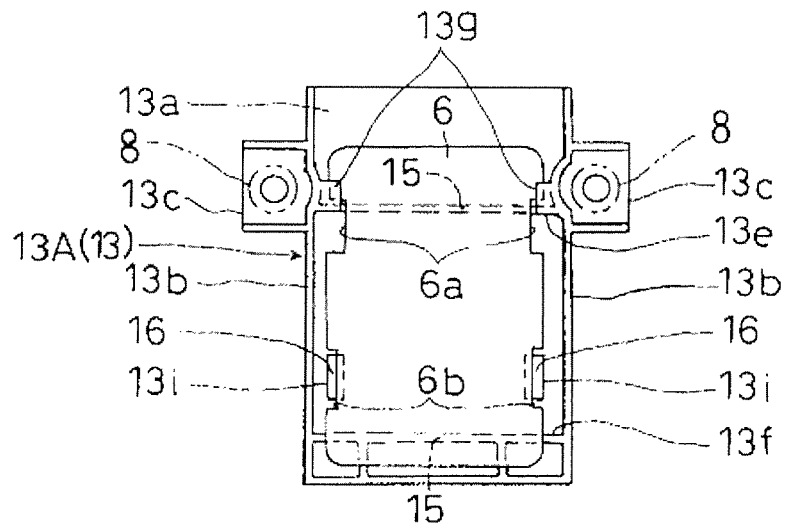
FIG. 7B is a diagram illustrating the procedure for assembling the switch attachment structure.
Figure 7C:
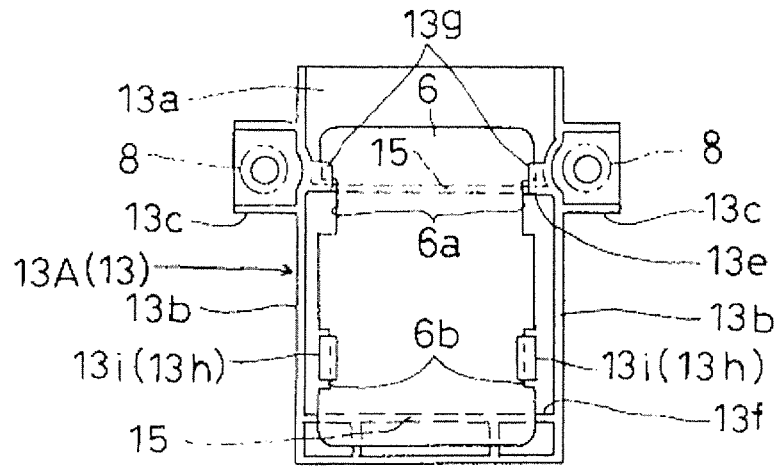
FIG. 7C is a diagram illustrating the procedure for assembling the switch attachment structure.

Moreover, as shown in FIG. 7A, the front recesses 6a of the support board 6 are loosely fitted together with the engagement prongs 13g. The engagement prongs 13g are inserted into the front recesses 6a. Then, as shown in FIG. 7b, the support board 6 is moved in the backward direction b so that front side corners (e.g., edge parts) of the front recesses 6a are engaged with the engagement prongs 13g. In particular, a top face 6c of the support board 6 is engaged with the engagement prongs 13g. The support board 6 is pushed along the inclination guide faces 16 of the hooks 13i, so that the elastic plates 13h are elastically displaced outward as shown in FIG. 7C. The rear recesses 6b of the support board 6 are latched to the hooks 13i, respectively, when the support board 6 is disposed on the lateral plates 13e and 13f. The elastic plates 13h are fitted into the rear recesses 6b of the support board 6, and the hooks 13i are latched to edge parts of the rear recesses 6b of the support board 6. In particular, the hooks 13i are latched to the top face 6c of the support board 6. As a result, the support board 6 is fitted into the recesses 15 of the lateral plates 13e and 13f.

With the flat panel display device, there are only two screw-down places on the holder 13, which is fewer than in the conventional flat panel display device. Thus, the work of fixing the AC switch 7 can be carried out more efficiently. Furthermore, the number of the screws 8 used is only half that in the conventional flat panel display device. Thus, the cost is also lower.

The synthetic resin holder 13 is interposed between the support board 6 with the AC switch 7 and the two screws 8. Thus, an adequate insulating distance (creepage distance) C (see FIG. 3) between the support board 6 with the AC switch 7 and the two screws 8 is ensured. In other words, with the holder 13, the creepage distance between the support board 6 with the AC switch 7 and the two screws 8 can become longer than that of the conventional flat panel display device. In particular, the holder 13 includes the side plates 13b that is disposed between the support board 6 and the screws 8 to ensure the adequate creepage distance. Also, the holder 13 includes the screw mounts 13c that are formed outside of the holder main body 13A to ensure the adequate creepage distance. Therefore, the support board 6 can be smaller than that of the conventional flat panel display device. As a result, the cost can be reduced. Here, the creepage distance means the shortest path between conductive parts (e.g., support board 6 and the screws 8) measured along the surface of the holder 13. Furthermore, the support board 6 is housed inside of the holder main body 13A, and the screw mounts 13c are formed outside of the holder main body 13A. Thus, the clearance distance between the support board 6 and the screws 8 can also become longer. Here, the clearance distance means the shortest distance between conductive parts (e.g., support board 6 and the screws 8) measured through air.

The leg component 13B is integrally provided protruding from the holder main body 13A, and is extended along the side face (e.g., bottom side face) 3b of the chassis 3. Thus, the holder main body 13A can be stably fixed to the chassis 3. Therefore, unintended movement of the holder main body 13A can be prevented. In particular, the AC switch 7 and the leg component 13B are located on a same side of the flat panel display device relative to the axis A1. Thus, even if the AC switch 7 is pushed downward, the lec component 13B prevents the holder 13 from rotating about the axis A1 by contacting with the side face 3b.

The leg component 13B, which is made of an insulating material, is interposed between the support board 6 with the AC switch 7 and the chassis 3. Thus, an adequate insulating distance (creepage distance) D (see FIG. 3) between the support board 6 with the AC switch 7 and the chassis 3 can be ensured. In other words, the creepage distance can become longer than that of the conventional flat panel display device.

The flat panel display device includes the liquid crystal television set. However, the application of the switch attachment structure is not limited to this. The switch attachment structure can also be applied to a liquid crystal monitor or any of various other flat panel display devices.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a flat panel display device equipped with the present invention. Accordingly, these terms, as utilized to describe the present invention should be interpreted relative to a flat panel display device equipped with the present invention as used in the normal operating position.

While only a preferred embodiment has been chosen to illustrate the present invention, it will be apparent to those skilled in the art from these disclosures that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Furthermore, the foregoing descriptions of the preferred embodiment according to the present invention are provided for illustration only, and not for the purpose of limiting the invention as defined by the appended claims and their equivalents.

What is claimed is:

1. A flat panel display device comprising: a cabinet; a flat panel display component disposed within the cabinet, the flat panel display component having a chassis with a pair of screw holes; a control board fixedly coupled to the chassis of the flat panel display component; a switch unit configured to switch power supply to the control board, the switch unit having a support board that is electrically connected to the control board and an AC switch that is disposed on the support board and that is electrically connected to the support board; a switch unit holder made of an insulating material and fixedly coupled to the chassis of the flat panel display component, the switch unit holder having a holder main body with a pair of side plates that defines inside of the holder main body there between with the holder main body holding the support board of the switch unit inside of the holder main body, and a pair of screw mount portions that is integrally formed with the holder main body with the screw mount portions extending outside of the holder main body from the side plates of the holder main body, respectively, each of the screw mount portions having a screw insertion hole; and a pair of screws disposed through the screw insertion holes of the screw mount portions of the switch unit holder and threaded into the screw holes of the chassis of the flat panel display component such that the switch unit holder is fixedly coupled to the chassis of the flat panel display component with the screws; wherein the holder main body of the switch unit holder further has first and second lateral plates that extend between the side plates, respectively, the first and second lateral plates being formed at spaced apart locations in a direction perpendicular to the first and second lateral plates, the support board of the switch unit being disposed on the first and second lateral plates of the holder main body of the switch unit holder; wherein the first lateral plate of the holder main body of the switch unit holder further has a pair of engagement prongs at both end portions of the first lateral plate, the engagement prongs extending parallel to a bottom plate of the holder main body of the switch unit holder, the engagement prongs being engaged with a top face of the support board of the switch unit; wherein the holder main body of the switch unit holder further has a pair of hook portions that is located between the first and second lateral plates of the holder main body of the switch unit holder, the hook portions being engaged with the top face of the support board of the switch unit; wherein the support board of the switch unit further has a pair of first recess portions and a pair of second recess portions, the first and second recess portions being formed on side edges of the support board of the switch unit, the first recess portions being located corresponding to the engagement prongs of the first lateral plate of the holder main body of the switch unit holder, the second recess portions being located corresponding to the hook portions of the holder main body of the switch unit holder.

2. The flat panel display device according to claim 1, wherein
the switch unit holder further has a leg component that extends from the holder main body along a side face of the chassis of the flat panel display component.

3. The flat panel display device according to claim 2, wherein
the AC switch of the switch unit and the leg component of the switch unit holder are located on a same side of the flat panel display device relative to an axis that extends through the screw mount portions of the switch unit holder when viewed from a direction parallel to central axes of the screw insertion holes of the screw mount portions of the switch unit holder.

* * * * *